United States Patent
Yamanaka et al.

(10) Patent No.: US 11,548,500 B2
(45) Date of Patent: Jan. 10, 2023

(54) PARKING ASSIST SYSTEM

(71) Applicant: HONDA MOTOR CO., LTD., Tokyo (JP)

(72) Inventors: Hiroshi Yamanaka, Saitama (JP); Yuki Hara, Saitama (JP); Yasushi Shoda, Saitama (JP); Megumi Kageyama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 171 days.

(21) Appl. No.: 17/113,200

(22) Filed: Dec. 7, 2020

(65) Prior Publication Data

US 2021/0179084 A1 Jun. 17, 2021

(30) Foreign Application Priority Data

Dec. 13, 2019 (JP) .............................. JP2019-225934

(51) Int. Cl.
*B60W 30/06* (2006.01)
*B60W 10/10* (2012.01)
(Continued)

(52) U.S. Cl.
CPC ............ *B60W 30/06* (2013.01); *B60W 10/04* (2013.01); *B60W 10/10* (2013.01); *B60W 10/18* (2013.01);
(Continued)

(58) Field of Classification Search
CPC ...... B60W 30/06; B60W 10/04; B60W 10/10; B60W 10/18; B60W 10/20; B60W 10/22;
(Continued)

(56) References Cited

U.S. PATENT DOCUMENTS

2018/0257665 A1* 9/2018 Sannodo ............... B60W 30/06
2019/0202468 A1* 7/2019 Kaji ...................... B60W 50/14
(Continued)

FOREIGN PATENT DOCUMENTS

JP 2018144751 A 9/2018
JP 2019043174 A 3/2019
(Continued)

OTHER PUBLICATIONS

Notice of Reasons for Refusal for Patent Application JP 2019-225934 dated Jul. 27, 2021; 12 pp.

*Primary Examiner* — Jonathan M Dager
*Assistant Examiner* — Jean W Charleston
(74) *Attorney, Agent, or Firm* — Armstrong Teasdale LLP

(57) ABSTRACT

A parking assist system includes: a control device configured to execute a driving process for autonomously moving a vehicle to a target position; a steering operation member configured to receive a steering operation performed by an occupant; a vehicle state detecting device; and a notification device configured to make a notification to the occupant. In the driving process, the control device executes vehicle speed control and steering control. When, during execution of the driving process, the control device determines that the vehicle is a suspension state in which the driving process should be temporarily suspended, the control device causes the notification device to output a prescribed notification and executes a suspension process. In the suspension process, the control device executes the vehicle speed control to stop the vehicle and stops the steering control.

4 Claims, 5 Drawing Sheets

(51) Int. Cl.
*B60W 10/18* (2012.01)
*B60W 10/20* (2006.01)
*B60W 50/14* (2020.01)
*B60W 10/04* (2006.01)
*B60W 10/22* (2006.01)
*B60W 50/00* (2006.01)
*G08G 1/16* (2006.01)

(52) U.S. Cl.
CPC ............ *B60W 10/20* (2013.01); *B60W 10/22* (2013.01); *B60W 50/0098* (2013.01); *B60W 50/14* (2013.01); *G08G 1/168* (2013.01); *B60W 2510/22* (2013.01); *B60W 2540/12* (2013.01); *B60W 2710/10* (2013.01); *B60W 2710/18* (2013.01); *B60W 2710/20* (2013.01); *B60W 2710/22* (2013.01); *B60W 2720/10* (2013.01); *B60W 2720/12* (2013.01)

(58) Field of Classification Search
CPC ............ B60W 50/0098; B60W 50/14; B60W 2510/22; B60W 2540/12; B60W 2710/10; B60W 2710/18; B60W 2710/20; B60W 2710/22; B60W 2720/10; B60W 2720/12; G08G 1/168; B62D 15/0285
USPC .......................................................... 701/25
See application file for complete search history.

(56) References Cited

U.S. PATENT DOCUMENTS

| 2019/0258253 | A1* | 8/2019 | Tremblay | ............. G05D 1/0088 |
| 2020/0050212 | A1* | 2/2020 | Mimura | ............ B60W 30/0956 |
| 2020/0269835 | A1* | 8/2020 | Hara | ..................... B60W 30/06 |

FOREIGN PATENT DOCUMENTS

| WO | 2018193577 A1 | 10/2018 | |
| WO | WO-2018193577 A1 * | 10/2018 | ............ B60W 30/06 |

* cited by examiner

PARKING ASSIST SYSTEM

TECHNICAL FIELD

The present invention relates to a parking assist system for automatically moving a vehicle from a passage to a parking position or from a parking position to a passage.

BACKGROUND ART

JP2019-43174A discloses a parking assist system which, when a suspension condition is satisfied during execution of automatic parking assist, stops the vehicle and makes a notification device to notify executable operations to allow an occupant of the vehicle to select the next operation.

In the parking assist system of JP2019-43174A, it is unclear whether steering control is continued or stopped when the suspension condition is satisfied and the vehicle is stopped. When the steering control is continued, in some cases it is necessary to stop the steering control according to the steering operation by the occupant after the vehicle is stopped. In such a case, it is necessary to notify the stop of the steering control to the occupant to make the occupant recognize the control state of the vehicle. However, the occupant may have recognized that since the vehicle is in the stopped state, the steering control has been already stopped, and in such a case, the occupant may be confused by the notification. Also, the occupant may be annoyed if the notification is made again.

SUMMARY OF THE INVENTION

In view of the foregoing background, an object of the present invention is to provide a parking assist system in which the annoyance caused to the occupant is reduced.

To achieve such an object, one embodiment of the present invention provides a parking assist system (1), comprising: a control device (15) configured to control a powertrain (4) including a transmission, a brake device (5), and a steering device (6) to execute a driving process for autonomously moving a vehicle to a target position; a steering operation member (22) configured to receive a steering operation performed by an occupant of the vehicle to operate the steering device; a vehicle state detecting device (13) configured to detect a state of the vehicle; and a notification device (32, 33) configured to be controlled by the control device to make a notification to the occupant, wherein in the driving process, the control device executes vehicle speed control, in which the powertrain and the brake device are controlled to control a vehicle speed, and steering control, in which the steering device is controlled to control a steering angle, when, during execution of the driving process, the control device determines that the state of the vehicle is a suspension state in which the driving process should be temporarily suspended, the control device causes the notification device to output a prescribed notification and executes a suspension process, and in the suspension process, the control device executes the vehicle speed control to stop the vehicle and stops the steering control.

According to this configuration, the steering control is caused to stop in the suspension process executed by the control device. Therefore, when the occupant operates the steering operation member after the vehicle is stopped by the suspension process, the control device does not need to perform stopping of the steering control anew. This makes it unnecessary for the control device to additionally notify the occupant that the steering control is stopped. As a result, the parking assist system can reduce the annoyance caused to the occupant.

In the above configuration, preferably, the control device stops the steering control when starting the suspension process.

According to this configuration, the steering control is caused to stop when the control device starts the suspension process. Therefore, when the occupant operates the steering device while the vehicle is decelerated by the suspension process, the control device does not need to perform stopping of the steering control anew.

In the above configuration, preferably, the parking assist system further comprises a braking operation member (24) configured to receive a braking operation performed by the occupant to operate the brake device, wherein the control device is configured to permit resumption of the driving process when an operation of at least the braking operation member is detected during execution of the suspension process.

According to this configuration, the driving process can be resumed according to the operation performed by the occupant.

In the above configuration, preferably, when the control device determines, during execution of the driving process, that the state of the vehicle is a cancellation state, in which the driving process should be canceled, the control device causes the notification device to output a prescribed notification and executes a cancellation process, and in the cancellation process, the control device executes the vehicle speed control to stop the vehicle, and thereafter stops the vehicle speed control and stops the steering control.

According to this configuration, the steering control is caused to stop by the cancellation process executed by the control device.

In the above configuration, preferably, the control device is configured to determine that the state of the vehicle is the cancellation state when the control device detects a steering operation on the steering operation member during execution of the driving process.

According to this configuration, when the occupant performs a steering operation on the steering operation member, the control device stops the steering control and makes a notification. Thereafter, if the occupant performs a steering operation on the steering operation member, the notification is not made because the steering control is already stopped.

According to the foregoing configuration, a parking assist system in which the annoyance caused to the occupant is reduced is provided.

DESCRIPTION OF THE PREFERRED EMBODIMENT(S)

In the following, an embodiment of the present invention will be described in detail with reference to the drawings.

A parking assist system 1 is mounted on a vehicle such as an automobile provided with a vehicle control system 2 configured to make the vehicle travel autonomously.

Figure 1:
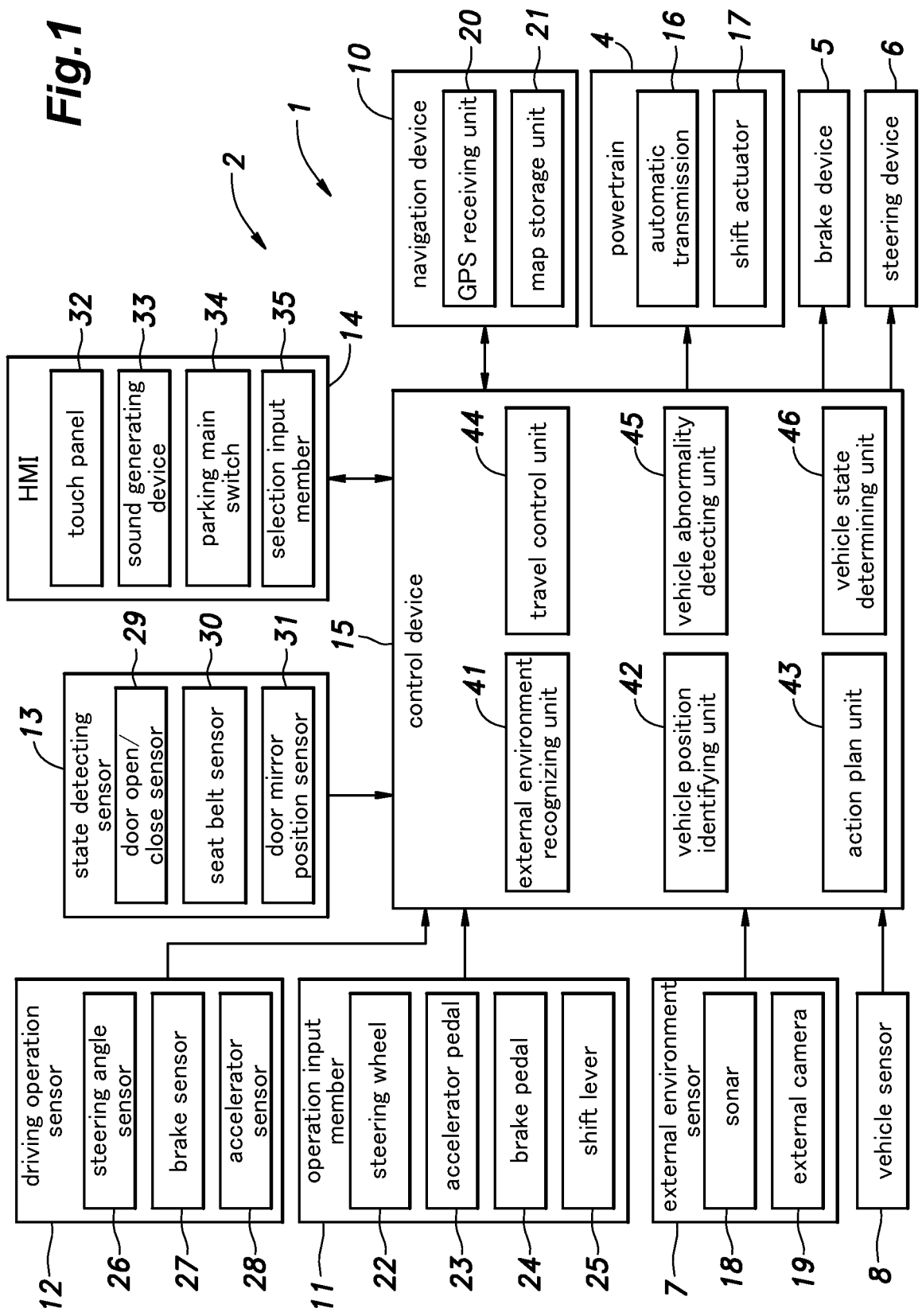
FIG. 1 is a functional block diagram of a vehicle provided with a parking assist system according to first to third embodiments of the present invention.

As shown in FIG. 1, the vehicle control system 2 includes a powertrain 4, a brake device 5, a steering device 6, an external environment sensor 7, a vehicle sensor 8, a navigation device 10, an operation input member 11, a driving operation sensor 12, a state detecting sensor 13, a human machine interface (HMI) 14, and a control device 15. The above components of the vehicle control system 2 are connected to each other so that signals can be transmitted therebetween via communication means such as a Controller Area Network (CAN).

The powertrain 4 is a device configured to apply a driving force to the vehicle. The powertrain 4 includes a power source and a transmission, for example. The power source includes at least one of an internal combustion engine, such as a gasoline engine and a diesel engine, and an electric motor. In the present embodiment, the powertrain 4 includes an automatic transmission 16 and a shift actuator 17 for changing a shift position of the automatic transmission 16 (a shift position of the vehicle). The brake device 5 is a device configured to apply a brake force to the vehicle. For example, the brake device 5 includes a brake caliper configured to press a brake pad against a brake rotor and an electric cylinder configured to supply an oil pressure to the brake caliper. The brake device 5 may include an electric parking brake device configured to restrict rotations of wheels via wire cables. The steering device 6 is a device for changing a steering angle of the wheels. For example, the steering device 6 includes a rack-and-pinion mechanism configured to steer (turn) the wheels and an electric motor configured to drive the rack-and-pinion mechanism. The powertrain 4, the brake device 5, and the steering device 6 are controlled by the control device 15.

The external environment sensor 7 serves as an external environment information acquisition device for detecting electromagnetic waves, sound waves, and the like from the surroundings of the vehicle to detect an object outside the vehicle and to acquire surrounding information of the vehicle. The external environment sensor 7 includes sonars 18 and external cameras 19. The external environment sensor 7 may further include a millimeter wave radar and/or a laser lidar. The external environment sensor 7 outputs a detection result to the control device 15.

Each sonar 18 consists of a so-called ultrasonic sensor. Each sonar 18 emits ultrasonic waves to the surroundings of the vehicle and captures the ultrasonic waves reflected by an object around the vehicle thereby to detect a position (distance and direction) of the object. Multiple sonars 18 are provided at each of a rear part and a front part of the vehicle. In the present embodiment, two pairs of sonars 18 are provided on a rear bumper so as to be spaced laterally from each other, two pairs of sonars 18 are provided on a front bumper so as to be spaced laterally from each other, one pair of sonars 18 is provided at a front end portion of the vehicle such that the two sonars 18 forming the pair are provided on left and right side faces of the front end portion of the vehicle, and one pair of sonars 18 is provided at a rear end portion of the vehicle such that the two sonars 18 forming the pair are provided on left and right side faces of the rear end portion of the vehicle. That is, the vehicle is provided with six pairs of sonars 18 in total. The sonars 18 provided on the rear bumper mainly detect positions of objects behind the vehicle. The sonars 18 provided on the front bumper mainly detect positions of objects in front of the vehicle. The sonars 18 provided at the left and right side faces of the front end portion of the vehicle detect positions of objects on left and right outsides of the front end portion of the vehicle, respectively. The sonars 18 provided at the left and right side faces of the rear end portion of the vehicle detect positions of objects on left and right outsides of the rear end portion of the vehicle, respectively.

The external cameras 19 are devices configured to capture images around the vehicle. Each external camera 19 consists of a digital camera using a solid imaging element such as a CCD or a CMOS, for example. The external cameras 19 include a front camera for capturing an image in front of the vehicle and a rear camera for capturing an image to the rear of the vehicle. The external cameras 19 may include a pair of left and right side cameras that are provided in the vicinity of the door mirrors of the vehicle to capture images on left and right sides of the vehicle.

The vehicle sensor 8 includes a vehicle speed sensor configured to detect the speed of the vehicle, an acceleration sensor configured to detect the acceleration of the vehicle, a yaw rate sensor configured to detect the angular velocity around a vertical axis of the vehicle, and a direction sensor configured to detect the direction of the vehicle. For example, the yaw rate sensor consists of a gyro sensor.

The navigation device 10 is a device configured to obtain a current position of the vehicle and provides route guidance to a destination and the like. The navigation device 10 includes a GPS receiving unit 20 and a map storage unit 21. The GPS receiving unit 20 identifies a position (latitude and longitude) of the vehicle based on a signal received from an artificial satellite (positioning satellite). The map storage unit 21 consists of a known storage device such as a flash memory or a hard disk, and stores map information.

The operation input member 11 is provided in a vehicle cabin to receive an input operation performed by the occupant (user) to control the vehicle. The operation input member 11 includes a steering wheel 22, an accelerator pedal 23, a brake pedal 24 (brake input member), and a shift lever 25 (a shift member). The shift lever 25 is configured to receive an operation for selecting the shift position of the vehicle.

The driving operation sensor 12 detects an operation amount of the operation input member 11. The driving operation sensor 12 includes a steering angle sensor 26 configured to detect a steering angle of the steering wheel 22, a brake sensor 27 configured to detect a pressing amount of the brake pedal 24, and an accelerator sensor 28 configured to detect a pressing amount of the accelerator pedal 23. The driving operation sensor 12 outputs a detected operation amount to the control device 15.

The state detecting sensor 13 is a sensor configured to detect a change in a state of the vehicle according to an operation by the occupant. The operation by the occupant detected by the state detecting sensor 13 includes an operation indicating an alighting intention (intention to alight from the vehicle) of the occupant and an operation indicating absence of an intention of the occupant to check the surroundings of the vehicle during an autonomous parking operation or an autonomous unparking operation. The state detecting sensor 13 includes, as sensors for detecting the operation indicating the alighting intention, a door open/close sensor 29 configured to detect opening and/or closing of a door of the vehicle and a seat belt sensor 30 configured to detect a fastening state of a seat belt. The state detecting sensor 13 includes, as a sensor to detect the operation corresponding to the abdicating intention, a door mirror position sensor 31 configured to detect a position of a door mirror. The state detecting sensor 13 outputs a signal indicating a detected change in the state of the vehicle to the control device 15.

The HMI 14 is an input/output device for receiving an input operation by the occupant and notifying the occupant of various kinds of information by display and/or voice. The HMI 14 includes, for example, a touch panel 32 that includes a display screen such as a liquid crystal display or an organic EL display and is configured to receive the input operation by the occupant, a sound generating device 33 such as a buzzer or a speaker, a parking main switch 34, and a selection input member 35. The parking main switch 34 receives the input operation by the occupant to execute selected one of an automatic parking process (autonomous parking operation) and an automatic unparking process (autonomous unparking operation). The parking main switch 34 is a so-called momentary switch that is turned on only while a pressing operation (pushing operation) is performed by the occupant. The selection input member 35 receives a selection operation by the occupant related to selection of the automatic parking process and the automatic unparking process. The selection input member 35 may consist of a rotary select switch, which preferably requires pressing as the selection operation.

The control device 15 consists of an electronic control unit (ECU) that includes a CPU, a nonvolatile memory such as a ROM, a volatile memory such as a RAM, and the like. The CPU executes operation processing according to a program so that the control device 15 executes various types of vehicle control. The control device 15 may consist of one piece of hardware, or may consist of a unit including multiple pieces of hardware. Further, the functions of the control device 15 may be at least partially executed by hardware such as an LSI, an ASIC, and an FPGA, or may be executed by a combination of software and hardware.

Further, the control device 15 executes an arithmetic process according to a program and thereby performs a conversion process of an image (video) captured by the external cameras 19 so as to generate a look-down image corresponding to a plan view of the vehicle and its surrounding area and a bird's-eye image corresponding to a three-dimensional image of the vehicle and a part of its surrounding area positioned in the travel direction as viewed from above. The control device 15 may generate the look-down image by combining the images of the front camera, the rear camera, and the left and right side cameras, and may generate the bird's-eye image by combining the image captured by the front camera or the rear camera facing the travel direction and the images captured by the left and right side cameras.

The parking assist system 1 is a system for executing the so-called automatic parking process and the so-called automatic unparking process, in which a vehicle is moved autonomously to a prescribed target position (a target parking position or a target unparking position) selected by the occupant so as to park or unpark the vehicle.

The parking assist system 1 includes the control device 15, the brake pedal 24 as a brake input member, the driving operation sensor 12, and the state detecting sensor 13.

The control device 15 controls the powertrain 4, the brake device 5, and the steering device 6 so as to execute an autonomous parking operation to move the vehicle autonomously to a target parking position and park the vehicle at the target parking position and an autonomous unparking operation to move the vehicle autonomously to a target unparking position and unpark the vehicle at the target unparking position. In order to execute such operations, the control device 15 includes an external environment recognizing unit 41, a vehicle position identifying unit 42, an action plan unit 43, a travel control unit 44, a vehicle abnormality detecting unit 45, and a vehicle state determining unit 46.

The external environment recognizing unit 41 recognizes an obstacle (for example, a parked vehicle or a wall) that is present around the vehicle based on the detection result of the external environment sensor 7, and thereby obtains information about the obstacle. Further, the external environment recognizing unit 41 analyzes the images captured by the external cameras 19 based on a known image analysis method such as pattern matching, and thereby determines whether a wheel stopper or an obstacle is present, and obtains the size of the wheel stopper or the obstacle in a case where the wheel stopper or the obstacle is present. Further, the external environment recognizing unit 41 may compute a distance to the obstacle based on signals from the sonars 18 to obtain the position of the obstacle.

Also, by the analysis of the detection result of the external environment sensor 7 (more specifically, by the analysis of the images captured by the external cameras 19 based on a known image analysis method such as pattern matching), the external environment recognizing unit 41 can acquire, for example, a lane on a road delimited by road signs and a parking space delimited by white lines and the like provided on a surface of a road, a parking lot, and the like.

The vehicle position identifying unit 42 identifies the position of the vehicle (the own vehicle) based on a signal from the GPS receiving unit 20 of the navigation device 10. Further, the vehicle position identifying unit 42 may obtain the vehicle speed and the yaw rate from the vehicle sensor 8, in addition to the signal from the GPS receiving unit 20, and identify the position and posture of the vehicle by the so-called inertial navigation.

The travel control unit 44 controls the powertrain 4, the brake device 5, and the steering device 6 based on a travel control instruction from the action plan unit 43 to make the vehicle travel. The travel control unit 44 controls the steering device 6 based on steering control and controls the powertrain 4 and the brake device 5 based on vehicle speed control.

The vehicle abnormality detecting unit 45 detects an abnormality of the vehicle (hereinafter referred to as "vehicle abnormality") based on signals from various devices and sensors. The vehicle abnormality detected by the vehicle abnormality detecting unit 45 includes failure of various devices necessary for driving the vehicle (for example, the powertrain 4, the brake device 5, and the steering device 6) and failure of various sensors necessary for making the vehicle travel autonomously (for example, the external environment sensor 7, the vehicle sensor 8, and the GPS receiving unit 20). Further, the vehicle abnormality includes failure of the HMI 14.

In the present embodiment, the vehicle abnormality detecting unit 45 can detect an abnormality in the screen display of the touch panel 32 based on at least a signal from the touch panel 32.

The vehicle state determining unit 46 acquires the state of the vehicle based on signals from various sensors provided in the vehicle, and determines whether the vehicle is in a prohibition state in which the autonomous movement (namely, the autonomous parking operation or the autonomous unparking operation) of the vehicle should be prohibited. Here, the prohibition state may be also referred to as a suspension state in which the autonomous travel of the vehicle should be temporarily suspended. The vehicle state determining unit 46 determines that the vehicle is in the prohibition state when the occupant performs a driving operation (override operation) of the operation input member 11. The override operation is an operation to override (cancel) the autonomous movement (namely, the autonomous parking operation or the autonomous unparking operation) of the vehicle. Thus, the vehicle state determining unit 64 determines that the vehicle is in the prohibition state when the occupant operates the steering device 6 while the travel control unit 44 is executing the steering control by controlling the steering device 6. In addition, the vehicle state determining unit 64 determines that the vehicle is in the prohibition state when the occupant operates any of the accelerator pedal 23, the brake pedal 24, and the shift lever 25 while the travel control unit 44 is executing the vehicle speed control by controlling the powertrain 4 and the brake device 5.

More specifically, the vehicle state determining unit 46 may determine the initiation of the override operation when the pressing amount of the brake pedal 24 acquired (detected) by the brake sensor 27 has reached or exceeded a prescribed threshold (hereinafter referred to as "pressing threshold"). Additionally or alternatively, the vehicle state determining unit 46 may determine the initiation of the override operation when a pressing amount of the accelerator pedal 23 acquired (detected) by the accelerator sensor 28 has reached or exceeded a prescribed threshold. The vehicle state determining unit 46 may also determine the initiation of the override operation when a changing rate of the steering angle obtained (detected) by the steering angle sensor 26 has reached or exceeded a prescribed threshold. Note that if the occupant operates the steering device 6 when the steering control is stopped (not executed), the vehicle state determining unit 46 does not determine that the vehicle is in the prohibition state or that the override operation has been performed. Also, if the occupant operates any of the accelerator pedal 23, the brake pedal 24, and the shift lever 25 when the vehicle speed control is stopped (not executed), the vehicle state determining unit 46 does not determine that the vehicle is in the prohibition state or that the override operation has been performed.

Further, the vehicle state determining unit 46 determines, based on the detection result of the state detecting sensor 13, that the vehicle is in the prohibition state when the vehicle is in a state that reflects the alighting intention (intention to alight from the vehicle) of the occupant. More specifically, when the door open/close sensor 29 detects that the door is opened, the vehicle state determining unit 46 determines that the vehicle is in the prohibition state. Also, when the seat belt sensor 30 detects that the seat belt is released, the vehicle state determining unit 46 determines that the vehicle is in the prohibition state.

Further, the vehicle state determining unit 46 determines that, based on the detection result of the state detecting sensor 13, that the vehicle is in the prohibition state when the vehicle is in a state that reflects the absence of intention of the occupant to check the surroundings of the vehicle. More specifically, the vehicle state determining unit 46 determines that the vehicle is in the prohibition state when the door mirror position sensor 31 detects that the door mirror is retracted.

Also, when it is determined, based on the detection result of the state detecting sensor 13, that the door is opened and the seat belt is released, the vehicle state determining unit 46 determines that the alighting intention of the occupant is certain and that the vehicle is in a cancellation state in which the autonomous movement (namely, the autonomous parking operation or the autonomous unparking operation) of the vehicle should be canceled. In addition, the vehicle state determining unit 46 may determine that the vehicle is in the cancellation state when there is an input to a cancellation button displayed on the touch panel 32 while the vehicle is moving autonomously.

In the present embodiment, each vehicle seat provided in the vehicle cabin is provided with a seating sensor configured to detect seating of the occupant. The vehicle state determining unit 46 determines a seating position of the occupant (namely, the vehicle state determining unit 46 identifies the vehicle seat on which the occupant is seated) based on a signal from the seating sensor, and determines that the vehicle is in the cancellation state when the seat belt at the seating position is released and the door near the seating position is opened.

As described above, the driving operation sensor 12 and the state detecting sensor 13 each correspond to the vehicle state detecting device configured to detect the state of the vehicle (for example, the prohibition state in which the autonomous parking operation or the autonomous unparking operation of the vehicle should be prohibited). The vehicle state determining unit 46 determines the state of the vehicle based on the detection results of the driving operation sensor 12 and the state detecting sensor 13. By using the driving operation sensor 12, it is possible to easily detect the override operation of the occupant. By using the state detecting sensor 13, it is possible to easily detect an alighting operation of the user and a change in the state of the vehicle according to an extending/retracting operation of the door mirror.

The action plan unit 43 executes the automatic parking process (autonomous parking operation) or the automatic unparking process (autonomous unparking operation) when the vehicle is in a prescribed state and the HMI 14 or the parking main switch 34 receives a prescribed input by the user, which corresponds to a request for the automatic parking process or the automatic unparking process. More specifically, the action plan unit 43 executes the automatic parking process in a case where a prescribed input corresponding to the automatic parking process is performed when the vehicle is stopped or the vehicle is traveling at a low speed equal to or less than a prescribed vehicle speed (a vehicle speed at which a parking position candidate can be searched for). The action plan unit 43 executes the automatic unparking process (parallel unparking process) in a case where a prescribed input corresponding to the automatic unparking process is performed when the vehicle is stopped. The selection of the process to be executed (the automatic parking process or the automatic unparking process) may be made by the action plan unit 43 based on the state of the vehicle. Alternatively, the above selection may be made by the occupant via the touch panel 32 or the selection input member 35. When executing the automatic parking process, the action plan unit 43 first makes the touch panel 32 display a parking search screen for setting the target parking position. After the target parking position is set, the action plan unit 43 makes the touch panel 32 display a parking screen. When executing the automatic unparking process, the action plan unit 43 first makes the touch panel 32 display an unparking search screen for setting the target unparking position. After the target unparking position is set, the action plan unit 43 makes the touch panel 32 display an unparking screen.

In the following, the automatic parking process will be described with reference to FIG. 2. The action plan unit 43 first executes an acquisition process (step ST1) to acquire one or more parking spaces, if any. More specifically, in a case where the vehicle is stopped, the action plan unit 43 first makes the touch panel 32 of the HMI 14 display a notification that instructs the occupant to move the vehicle straight. While the occupant sitting in the driver's seat (hereinafter referred to as "driver") is moving the vehicle straight, the external environment recognizing unit 41 acquires, based on a signal from the external environment sensor 7, a position and size of each detected obstacle and positions of the white lines provided on the road surface. The external environment recognizing unit 41 extracts, based on the acquired position and size of the obstacle and the acquired positions of the white lines, one or more undelimited parking spaces and one or more delimited parking spaces, if any (hereinafter, the undelimited parking spaces and the delimited parking spaces will be collectively referred to as "parking spaces"). Each undelimited parking space is a space that is not delimited by the white lines or the like, has a size sufficient to park the vehicle, and is available (namely, there is no obstacle therein). Each delimited parking space is a space that is delimited by the white lines or the like, has a size sufficient to park the vehicle, and is available (namely, another vehicle (vehicle other than the own vehicle) is not parked).

Next, the action plan unit 43 executes a trajectory calculation process (step ST2) to calculate a trajectory of the vehicle from a current position of the vehicle to each extracted parking space. In a case where the trajectory of the vehicle can be calculated for a certain parking space, the action plan unit 43 sets the parking space as a parking position candidate where the vehicle can be parked, and make the touch panel 32 display the parking position candidate on the screen (the parking search screen). In a case where the trajectory of the vehicle cannot be calculated due to the presence of the obstacle, the action plan unit 43 does not set the parking space as a parking position candidate and does not make the touch panel 32 display the parking space on the screen. When the action plan unit 43 sets multiple parking position candidates (namely, multiple parking places for which the trajectory of the vehicle can be calculated), the action plan unit 43 makes the touch panel 32 display these parking position candidates.

Figure 3A:
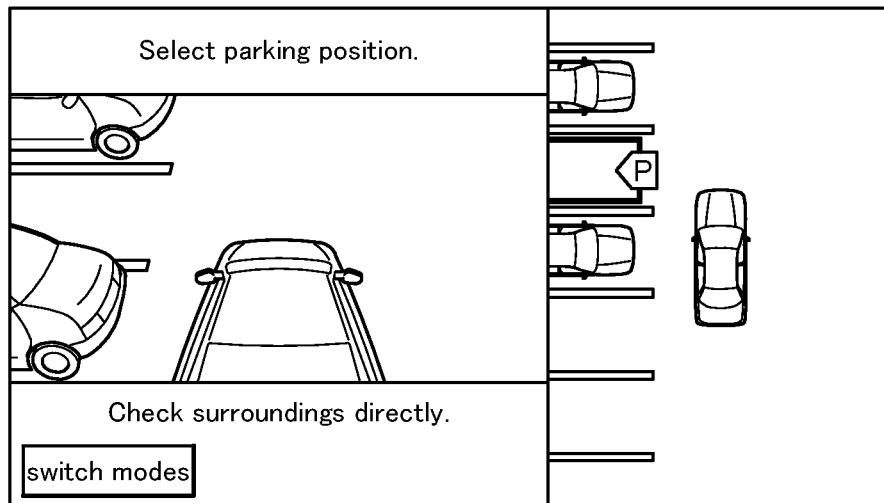
FIG. 3A is a diagram showing a screen display of a touch panel during a target parking position reception process.

Next, the action plan unit 43 executes a target parking position reception process (step ST3) to receive a selection operation performed by the occupant to select the target parking position, which is a parking position where the occupant wants to park the vehicle, and is selected from the one or more parking position candidates displayed on the touch panel 32. More specifically, the action plan unit 43 makes the touch panel 32 display the look-down image and the bird's-eye image in the travel direction on the parking search screen shown in FIG. 3A. When the action plan unit 43 acquires at least one parking position candidate, the action plan unit 43 makes the touch panel 32 display a frame that indicates the parking position candidate and an icon that corresponds to the frame in at least one of the look-down image and the bird's-eye image (in the look-down image in FIG. 3A) in an overlapping manner. The icon consists of a symbol indicating the parking position candidate (see "P" in FIG. 3A). Also, the action plan unit 43 makes the touch panel 32 display the parking search screen including a notification that instructs the driver to stop the vehicle and select the target parking position, so that the touch panel 32 receives the selection operation of the target parking position. The selection operation of the target parking position may be performed via the touch panel 32, or may be performed via the selection input member 35.

Figure 3B:
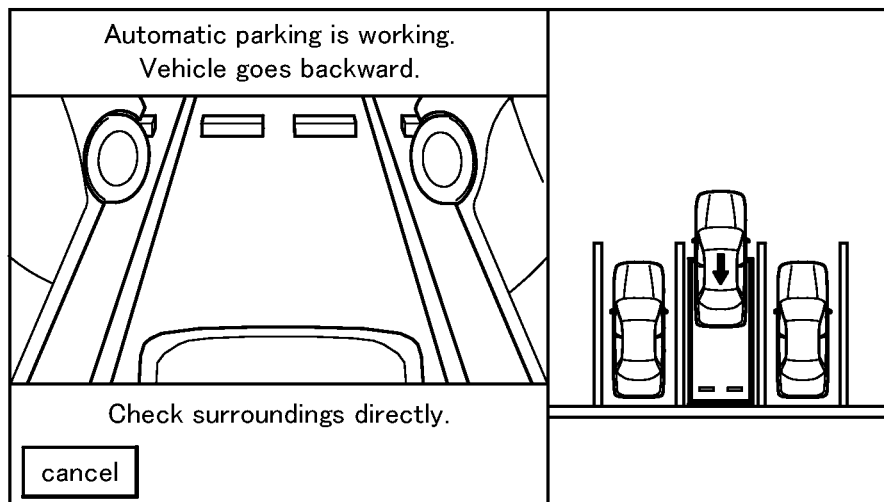
FIG. 3B is a diagram showing the screen display of the touch panel during a driving process.

After the vehicle is stopped and the target parking position is selected by the driver, the action plan unit 43 makes the touch panel 32 switch the screen from the parking search screen to the parking screen. As shown in FIG. 3B, the parking screen is a screen in which an image in the travel direction of the vehicle (hereinafter referred to as "travel direction image") is displayed on the left half of the touch panel 32 and the look-down image including the vehicle and its surrounding area is displayed on the right half thereof. At this time, the action plan unit 43 may make the touch panel 32 display a thick frame that indicates the target parking position selected from the parking position candidates and an icon that corresponds to the thick frame such that the thick frame and the icon overlap with the look-down image. This icon consists of a symbol indicating the target parking position, and is shown in a color different from the symbol indicating the parking position candidate.

After the target parking position is selected and the screen of the touch panel 32 is switched to the parking screen, the action plan unit 43 executes a driving process (step ST4) to make the vehicle travel along the calculated trajectory. At this time, the action plan unit 43 controls the vehicle based on the position of the vehicle acquired by the GPS receiving unit 20 and the signals from the external cameras 19, the vehicle sensor 8, and the like so that the vehicle travels along the calculated trajectory. At this time, the travel control unit 44 controls the powertrain 4, the brake device 5, and the steering device 6 so as to execute the vehicle speed control and the steering control.

During the driving process, the action plan unit 43 may acquire the travel direction image from the external cameras 19 and make the touch panel 32 display the acquired travel direction image on the left half thereof. For example, as shown in FIG. 3B, when the vehicle is moving backward, the action plan unit 43 may make the touch panel 32 display an image to the rear of the vehicle captured by the external cameras 19 on the left half thereof. While the action plan unit 43 is executing the driving process, the surrounding image of the vehicle (the own vehicle) in the look-down image displayed on the right half of the touch panel 32 changes along with the movement of the vehicle. When the vehicle reaches the target parking position, the action plan unit 43 stops the vehicle and ends the driving process.

Figure 3C:
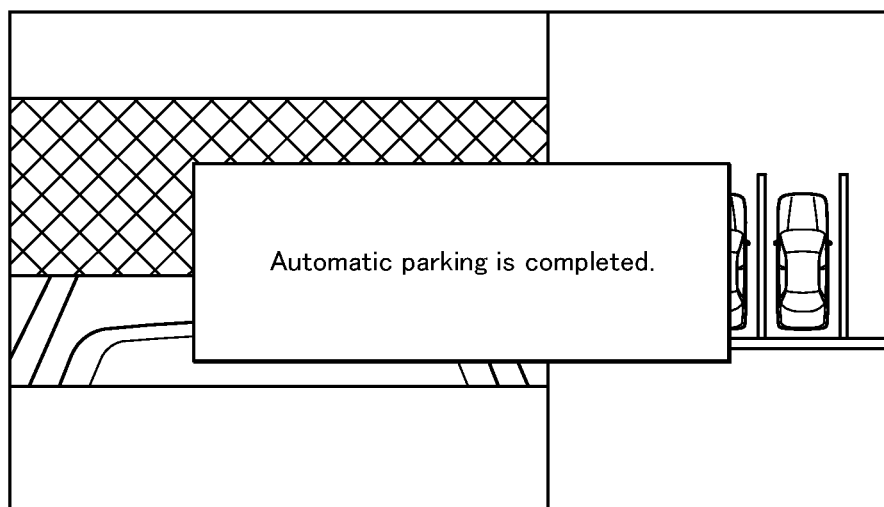
FIG. 3C is a diagram showing the screen display of the touch panel when automatic parking is completed.

When the driving process ends, the action plan unit 43 executes a parking process (step ST5). In the parking process, the action plan unit 43 first drives the shift actuator 17 to set the shift position (shift range) to a parking position (parking range). Thereafter, the action plan unit 43 drives the parking brake device, and makes the touch panel 32 display a pop-up window (see FIG. 3C) indicating that the automatic parking of the vehicle has been completed. The pop-up window may be displayed on the screen of the touch panel 32 for a prescribed period. Thereafter, the action plan unit 43 may make the touch panel 32 switch the screen to an operation screen of the navigation device 10 or a map screen.

In the parking process, there may be a case where the shift position cannot be changed to the parking position because of an abnormality of the shift actuator 17 or a case where the parking brake device cannot be driven because of an abnormality of the parking brake device. In these cases, the action plan unit 43 may make the touch panel 32 display the cause of the abnormality on the screen thereof.

Figure 4:
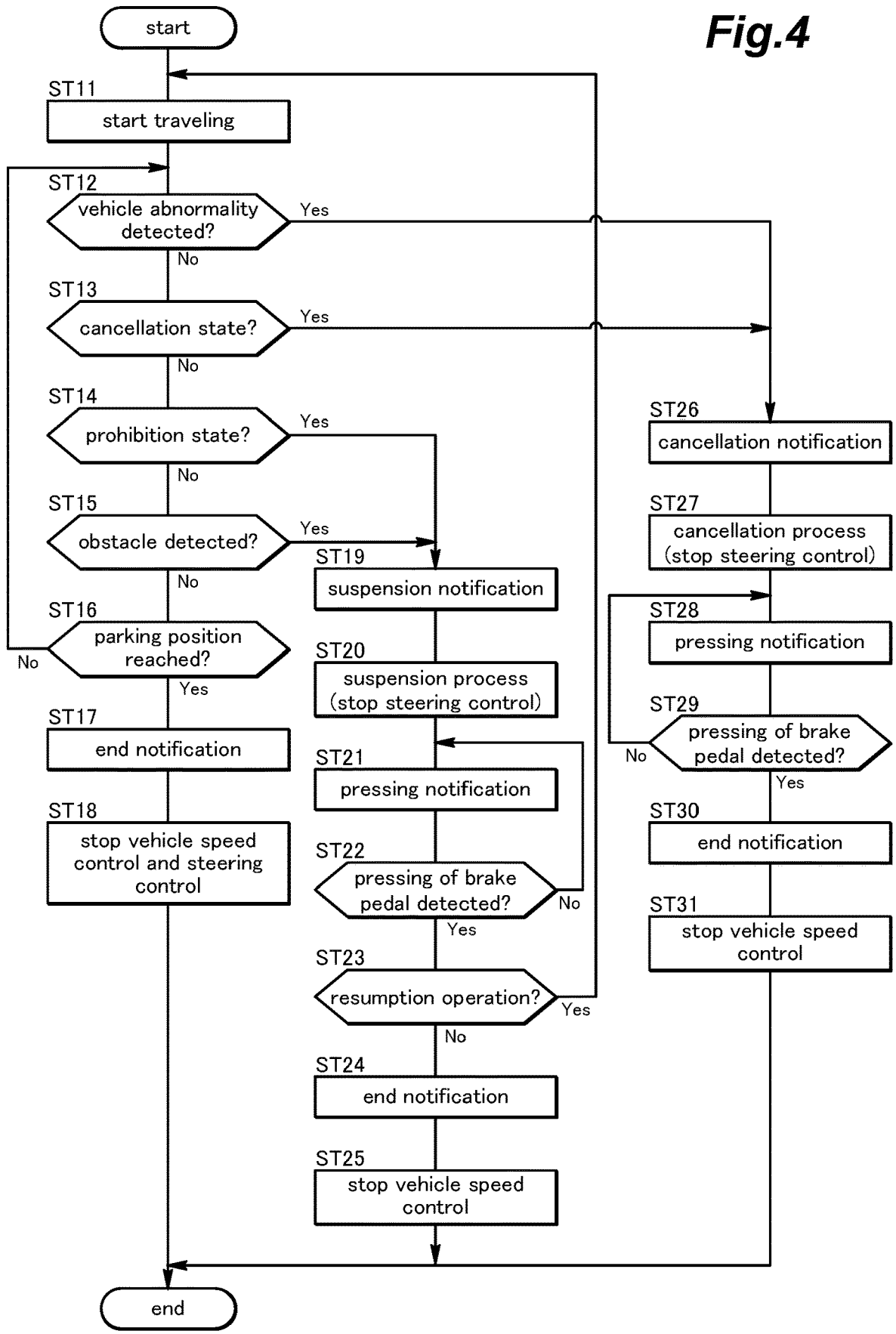
FIG. 4 is a flow chart of the driving process.

Next, details of the driving process executed by the action plan unit 43 will be described with reference to FIG. 4.

In the driving process, the action plan unit 43 first starts travelling of the vehicle (ST11). The action plan unit 43 executes the vehicle speed control and the steering control so as to cause the vehicle to travel along the calculated trajectory. Thereby, the vehicle starts traveling along the calculated trajectory at a prescribed vehicle speed.

Next, the action plan unit 43 determines whether a vehicle abnormality is detected by the vehicle abnormality detecting unit 45 (ST12). In the case where the vehicle abnormality is not detected (No in ST12), the action plan unit 43 determines whether the cancellation state is detected by the vehicle state determining unit 46 (ST13).

In the case where the cancellation state is not detected by the vehicle state determining unit 46 (No in ST13), the action plan unit 43 determines whether the prohibition state is detected by the vehicle state determining unit 46 (ST14). In the case where the prohibition state is not detected (No in ST14), the action plan unit 43 determines whether an obstacle is detected on the trajectory of the vehicle by the external environment recognizing unit 41 (ST15).

In the case where no obstacle is detected on the trajectory of the vehicle (No in ST15), the action plan unit 43 acquires the position of the vehicle and determines whether the position of the vehicle matches the target parking position, namely, whether the vehicle has reached the target parking position (ST16). If the vehicle has reached the target parking position (Yes in ST16), the action plan unit 43 causes at least one of the touch panel 32 and the sound generating device 33 to output an end notification (ST17). The end notification is a notification for letting the occupant recognize that the driving process will be ended. Subsequently, the action plan unit 43 drives the brake device 5 to stop the vehicle, and thereafter stops the vehicle speed control and the steering control (ST18).

In the case where the vehicle has not reached the target parking position (No in ST16), the action plan unit 43 repeats the process from step ST12 to move the vehicle along the trajectory to the target parking position.

Figure 5A:
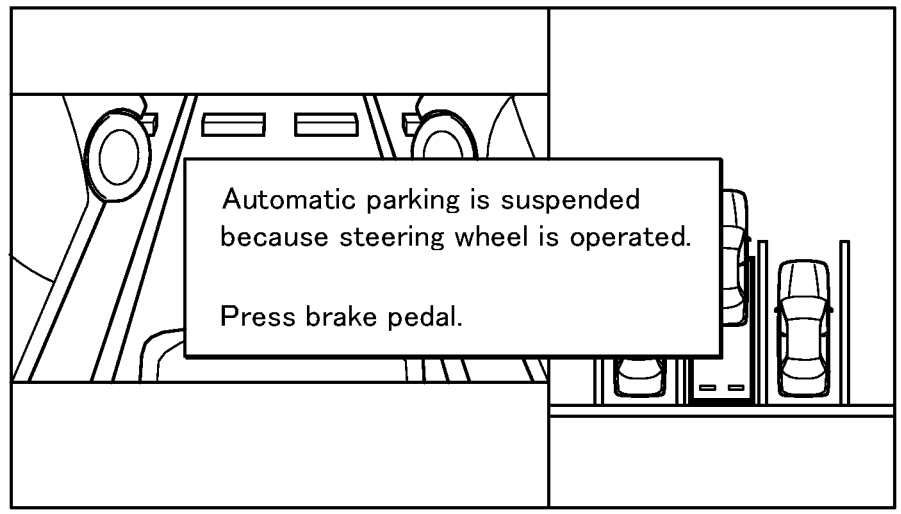
FIG. 5A is a diagram showing the screen display of the touch panel including a notification that the automatic parking is suspended.

In the case where the prohibition state is detected (Yes in ST14) or an obstacle is detect on the trajectory of the vehicle (Yes in ST15), the action plan unit 43 causes at least one the touch panel 32 and the sound generating device 33, each serving as a notification device, to output a suspension notification to notify suspension of the automatic parking process (ST19). The suspension notification may be a pop-up message displayed on the touch panel 32, for example (see FIG. 5A). The pop-up message may include the cause of the suspension of the automatic parking process, such as presence of an obstacle or opening of the door, for example. Also, the suspension notification preferably includes a notification sound and/or a voice message output from the sound generating device 33. Here, the suspension of the automatic parking process is a temporary stop of the automatic parking process, in which the automatic parking process can be resumed.

Following step ST19, the action plan unit 43 executes a suspension process (ST20). In the suspension process, the action plan unit 43 first stops the steering control. Thereby, supply of a driving force for changing or maintaining the steering angle to the steering device 6 is stopped. In this state, the steering device 6 allows the steering angle to change due to an external force applied to the wheels. On the other hand, in the suspension process, the action plan unit 43 continues the vehicle speed control to decelerate the vehicle at a prescribed deceleration. The action plan unit 43 continues the vehicle speed control even after the vehicle is stopped, and keeps the vehicle in the stopped state.

After executing the suspension process, the action plan unit 43 causes at least one of the touch panel 32 and the sound generating device 33 to output a pressing notification for requesting the occupant to press the brake pedal 24 (ST21). Thereafter, the action plan unit 43 determines whether the brake pedal 24 is pressed by the occupant (ST22). Preferably, the action plan unit 43 acquires the pressing amount of the brake pedal 24 based on the signal from the brake sensor 27, and determines that the brake pedal 24 is pressed by the occupant when the pressing amount is greater than or equal to a prescribed threshold value. If the pressing of the brake pedal 24 is not detected (No in ST22), the action plan unit 43 repeats steps ST21 and ST22.

Figure 5B:
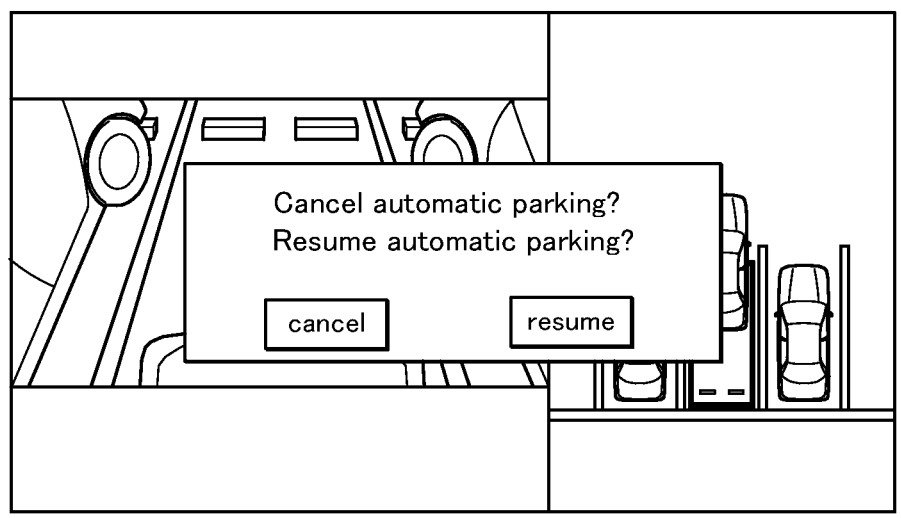
FIG. 5B is a diagram showing the screen display of the touch panel including a pop-up message including a cancellation button and a resumption button.

In the case where the pressing of the brake pedal 24 is detected (Yes in ST22), the action plan unit 43 determines whether a resumption operation is input by the occupant within the prescribed period (ST23). The resumption operation may be a touch operation on a resumption switch displayed on the touch panel 32, for example. Before the determination in step ST23, the action plan unit 43 may cause the touch panel 32 to display a message to query the occupant whether to resume the automatic parking (see FIG. 5B). Also, the resumption operation may be a pressing operation of the parking main switch 34. When the resumption operation is detected within the prescribed period (Yes in ST23), the action plan unit 43 returns to step ST11 to resume the steering control and to perform the travel control so that the vehicle is accelerated and starts traveling.

In the case where the resumption operation is not detected within the prescribed period (No in ST23), the action plan unit 43 causes at least one of the touch panel 32 and the sound generating device 33 to output an end notification (ST24). The end notification is a notification for letting the occupant recognize that the driving process will be ended. Subsequently, the action plan unit 43 stops the vehicle speed control (ST25).

Figure 5C:
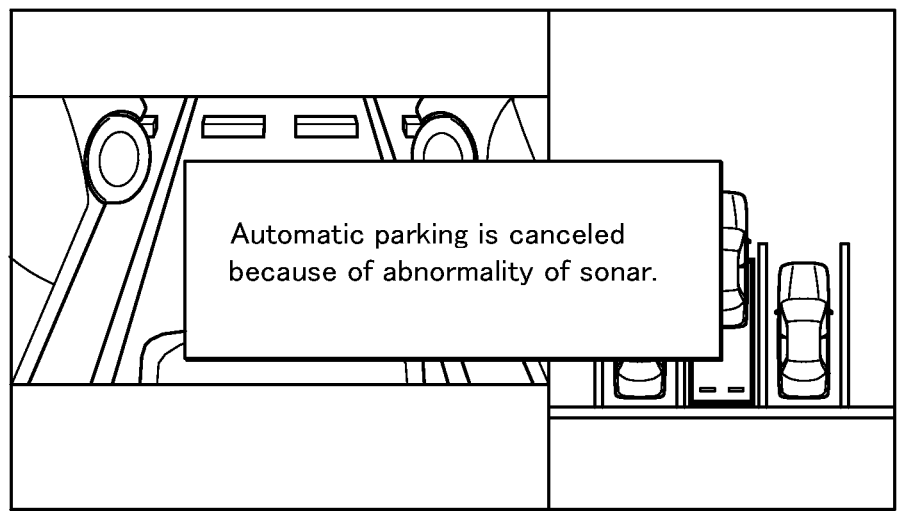
FIG. 5C is a diagram showing the screen display of the touch panel including a notification that the automatic parking is canceled.

In the case where an abnormality of the vehicle is detected (Yes in ST12) or the cancellation state is detected (Yes in ST13), the action plan unit 43 causes at least one of the touch panel 32 and the sound generating device 33, each serving as a notification device, to output a cancellation notification to notify cancellation of the automatic parking process (ST26). The cancellation notification may be a pop-up message displayed on the touch panel 32, for example (see FIG. 5C). The pop-up message may include the cause of the cancellation of the automatic parking process, such as an abnormality of the sonar 18, for example. Also, the cancellation notification preferably includes a notification sound and/or a voice message output from the sound generating device 33. Here, the cancellation of the automatic parking process means ending the automatic parking process, and thus is different from the above-described suspension.

Following step ST26, the action plan unit 43 executes a cancellation process (ST27). In the cancellation process, the action plan unit 43 continues the vehicle speed control and the steering control to decelerate the vehicle at a prescribed deceleration along the calculated trajectory. Then, the action plan unit 43 ends the steering control when the vehicle is stopped or immediately before the vehicle is stopped. On the other hand, the action plan unit 43 continues the vehicle speed control after the vehicle is stopped, to keep the vehicle in the stopped state.

After executing the cancellation process, the action plan unit 43 causes at least one of the touch panel 32 and the sound generating device 33 to output a pressing notification for requesting the occupant to press the brake pedal 24 (ST28). Thereafter, the action plan unit 43 determines whether the brake pedal 24 is pressed by the occupant (ST29). Preferably, the action plan unit 43 acquires the pressing amount of the brake pedal 24 based on the signal from the brake sensor 27, and determines that the brake pedal 24 is pressed by the occupant when the pressing amount is greater than or equal to the prescribed threshold value. If the pressing of the brake pedal 24 is not detected (No in ST29), the action plan unit 43 repeats steps ST28 and ST29.

In the case where the pressing of the brake pedal 24 is detected (Yes in ST29), the action plan unit 43 causes at least one of the touch panel 32 and the sound generating device 33 to output the end notification (ST30). Subsequently, the action plan unit 43 stops the vehicle speed control (ST31).

Figure 2:
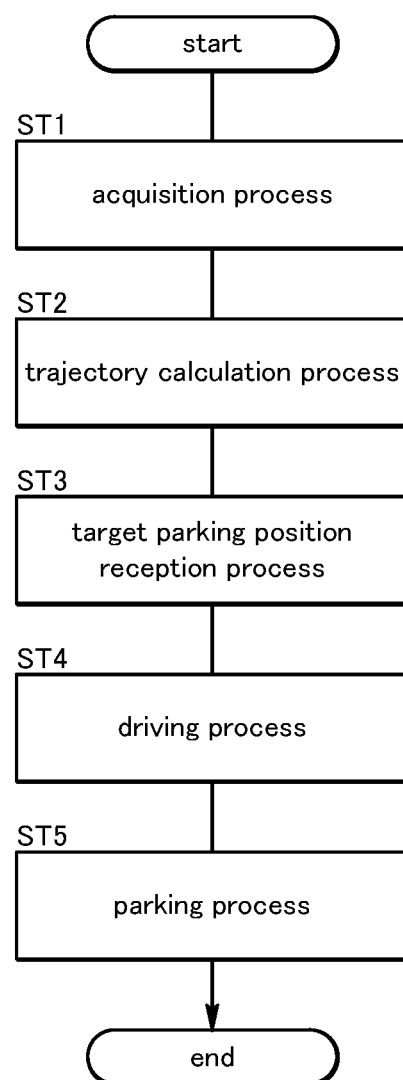
FIG. 2 is a flow chart of an automatic parking process according to the first embodiment of the present invention.

The action plan unit 43 executes the automatic unparking process in a manner similar to the automatic parking process shown in FIG. 2. In the automatic unparking process, the target parking position in the automatic parking process is replaced with the target unparking position. Also, in the automatic unparking process, the parking process in ST5 may be omitted. The action plan unit 43 may start the automatic unparking process upon an operation of the parking main switch 34 by the occupant when the vehicle is in a prescribed state.

According to the above-described embodiment, in the automatic parking or unparking process, the action plan unit 43 causes at least one of the touch panel 32 and the sound generating device 33 to output a notification before stopping each of the vehicle speed control and the steering control. Therefore, the occupant can recognize that each of the vehicle speed control and the steering control is stopped. Further, in the suspension process, the action plan unit 43 stops the steering control. Therefore, when the occupant operates the steering operation member after the vehicle is stopped by the suspension process, the action plan unit 43 does not need to perform stopping of the steering control anew. This makes it unnecessary for the action plan unit 43 to additionally notify the occupant that the steering control is stopped. As a result, the parking assist system 1 can reduce the annoyance caused to the occupant.

The action plan unit 43 stops the steering control when starting the suspension process. Therefore, when the occupant operates the steering device 6 while the vehicle is decelerated by the suspension process, the action plan unit 43 does not need to perform stopping of the steering control anew.

For example, when, during execution of the automatic parking process, the occupant presses the brake pedal 24, the vehicle state determining unit 46 determines that the vehicle is in the prohibition state, and the action plan unit 43 causes at least one of the touch panel 32 and the sound generating device 33 to output the suspension notification (ST19) and executes the suspension process to cause the vehicle to stop and to stop the steering control (ST20). Thereby, the occupant can recognize from the suspension notification that the steering control is stopped. Thereafter, if the occupant operates the steering device 6 during or after the execution of the suspension process, the vehicle state determining unit 46 does not determine that the vehicle is in the prohibition state because the steering control has been already ended. Therefore, the notification to the occupant also is not made.

Concrete embodiments of the present invention have been described in the foregoing, but various modifications and alterations are possible without being limited by the above-described embodiments.

The invention claimed is:

1. A parking assist system, comprising:
a control device configured to control a powertrain including a transmission, a brake device, and a steering device to execute a driving process for autonomously moving a vehicle to a target position;
a steering operation member configured to receive a steering operation performed by an occupant of the vehicle to operate the steering device;
a vehicle state detecting device configured to detect a state of the vehicle; and
a notification device configured to be controlled by the control device to make a notification to the occupant,
wherein in the driving process, the control device executes vehicle speed control, in which the powertrain and the brake device are controlled to control a vehicle speed, and steering control, in which the steering device is controlled to control a steering angle,
when, during execution of the driving process, the control device determines that the state of the vehicle is a suspension state in which the driving process should be temporarily suspended, the control device causes the notification device to output a prescribed notification and executes a suspension process, and
in the suspension process, the control device executes the vehicle speed control to stop the vehicle and stops the steering control,
wherein the control device is configured to
stop the steering control when starting the suspension process such that the steering angle changes due to an external force applied to wheels in the suspension process, and
in the suspension process, continue the vehicle speed control to decelerate the vehicle at a prescribed deceleration, and
wherein the control device is further configured to
execute a cancellation process when determining, during execution of the driving process, that the state of the vehicle is a cancellation state in which the driving process should be canceled, and
in the cancellation process, continue the vehicle speed control and the steering control to decelerate the vehicle at the prescribed deceleration along a calculated trajectory.

2. The parking assist system according to claim 1, further comprising a braking operation member configured to receive a braking operation performed by the occupant to operate the brake device,
wherein the control device is configured to permit resumption of the driving process when an operation of at least the braking operation member is detected during execution of the suspension process.

3. The parking assist system according to claim 1, wherein when the control device determines, during execution of the driving process, that the state of the vehicle is the cancellation state, in which the driving process should be canceled, the control device causes the notification device to output a prescribed notification and executes the cancellation process, and in the cancellation process, the control device executes the vehicle speed control to stop the vehicle, and thereafter stops the vehicle speed control and stops the steering control.

4. The parking assist system according to claim 3, wherein the control device is configured to determine that the state of the vehicle is the cancellation state when the control device detects the steering operation on the steering operation member during execution of the driving process.

* * * * *